US011640760B2

(12) United States Patent
Arling et al.

(10) Patent No.: US 11,640,760 B2
(45) Date of Patent: May 2, 2023

(54) SYSTEM AND METHOD FOR APPLIANCE CONTROL VIA A NETWORK

(71) Applicant: Universal Electronics Inc., Scottsdale, AZ (US)

(72) Inventors: Paul D. Arling, Irvine, CA (US); Jeffrey Kohanek, Westminster, CA (US); Norman G. Sheridan, Fremont, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 87 days.

(21) Appl. No.: 17/186,156

(22) Filed: Feb. 26, 2021

(65) Prior Publication Data

US 2021/0183234 A1    Jun. 17, 2021

Related U.S. Application Data

(63) Continuation of application No. 16/596,549, filed on Oct. 8, 2019, now Pat. No. 10,984,651, which is a
(Continued)

(51) Int. Cl.
*G05B 15/02* (2006.01)
*G08C 17/02* (2006.01)
(Continued)

(52) U.S. Cl.
CPC ............ *G08C 17/02* (2013.01); *G05B 15/02* (2013.01); *G06F 3/0486* (2013.01); *G08C 17/00* (2013.01);
(Continued)

(58) Field of Classification Search
None
See application file for complete search history.

(56) References Cited

U.S. PATENT DOCUMENTS

| 4,626,848 A | 12/1986 | Ehlers |
| 4,746,919 A | 5/1988 | Reitmeier |

(Continued)

FOREIGN PATENT DOCUMENTS

| CN | 101910960 A | 12/2010 |
| CN | 103999137 A | 8/2014 |

(Continued)

OTHER PUBLICATIONS

Korean Intellectual Property Office, Office Action issued on Korean patent application No. 10-2016-7033626, dated Feb. 22, 2021, 6 pages.

(Continued)

*Primary Examiner* — Ryan A Jarrett
(74) *Attorney, Agent, or Firm* — Greenberg Traurig, LLP (57) ABSTRACT

A first remote control application is configured to cause a smart device to transmit at least one command for controlling at least one functional operation of a controllable appliance in response to a user interface element of the smart device being activated while a second remote control application of a bridge device is configured to cause the bridge device to transmit at least one command for controlling at least one functional operation of the controllable appliance in response to receiving at the bridge device the at least one command transmitted from the smart device. The at least one command is transmitted from the smart device using a first transmission protocol and the at least one command is transmitted from the bridge device using a transmission protocol recognized by the controllable appliance.

15 Claims, 5 Drawing Sheets

Related U.S. Application Data continuation of application No. 16/106,831, filed on Aug. 21, 2018, now abandoned, which is a continuation of application No. 14/736,909, filed on Jun. 11, 2015, now Pat. No. 10,217,352, which is a continuation of application No. 13/328,416, filed on Dec. 16, 2011, now Pat. No. 9,088,663, which is a continuation-in-part of application No. 13/071,661, filed on Mar. 25, 2011, now Pat. No. 9,852,615.

(51) Int. Cl.
  *G06F 3/0486* (2013.01)
  *G08C 17/00* (2006.01)
  *G08C 19/28* (2006.01)
  *G08C 23/04* (2006.01)
  *H04M 1/72415* (2021.01)

(52) U.S. Cl.
  CPC ............ *G08C 19/28* (2013.01); *G08C 23/04* (2013.01); *H04M 1/72415* (2021.01); *G08C 2201/20* (2013.01); *G08C 2201/30* (2013.01); *G08C 2201/70* (2013.01); *G08C 2201/92* (2013.01); *G08C 2201/93* (2013.01); *H04M 2250/22* (2013.01)

(56) References Cited

U.S. PATENT DOCUMENTS

| | | |
|---|---|---|
| 5,255,313 A | 10/1993 | Darbee |
| 5,410,326 A | 4/1995 | Goldstein |
| 5,438,325 A | 8/1995 | Nishigaki et al. |
| 5,452,291 A | 9/1995 | Eisenhandler et al. |
| 5,519,457 A | 5/1996 | Nishigaki et al. |
| 5,537,104 A | 7/1996 | Van Dort et al. |
| 5,552,917 A | 9/1996 | Darbee et al. |
| 5,689,663 A | 11/1997 | Williams |
| 5,726,645 A | 3/1998 | Kamon et al. |
| 5,839,097 A | 11/1998 | Klausner |
| 5,909,183 A | 6/1999 | Borgstahl et al. |
| 5,949,351 A | 9/1999 | Hahm |
| 5,959,539 A | 9/1999 | Adolph et al. |
| 5,990,884 A | 11/1999 | Douma et al. |
| 6,133,847 A | 10/2000 | Yang |
| 6,148,241 A | 11/2000 | Ludtke et al. |
| 6,157,319 A | 12/2000 | Johns et al. |
| 6,160,491 A | 12/2000 | Kitao et al. |
| 6,508,401 B1 | 1/2003 | Terme |
| 6,567,011 B1 | 5/2003 | Young et al. |
| 6,724,339 B2 | 4/2004 | Conway |
| 6,748,278 B1 | 6/2004 | Maymudes |
| 6,781,518 B1 | 8/2004 | Hayes et al. |
| 6,791,467 B1 | 9/2004 | Ben-Ze'ev |
| 6,980,150 B2 | 12/2005 | Conway, Jr. et al. |
| 7,259,696 B1 | 8/2007 | Lee et al. |
| 7,271,732 B2 | 9/2007 | Harada |
| 7,429,932 B1 | 9/2008 | Newell et al. |
| 7,554,614 B2 | 6/2009 | Satou |
| 7,589,642 B1 | 9/2009 | Mui |
| 7,831,930 B2 | 11/2010 | Dresti et al. |
| 7,907,222 B2 | 3/2011 | Haughawout et al. |
| 7,936,287 B1 | 5/2011 | Lee et al. |
| 8,068,184 B2 | 11/2011 | Hicks |
| 8,098,337 B2 | 1/2012 | Martch |
| 8,132,105 B1 | 3/2012 | Dubil et al. |
| 8,179,404 B2 | 5/2012 | Nagatomo |
| 8,189,120 B2 | 5/2012 | Doyle |
| 8,203,436 B2 | 6/2012 | Ikeda |
| 8,509,400 B2 | 8/2013 | Liu et al. |
| 9,088,663 B2 | 7/2015 | Arling et al. |
| 9,451,306 B2 | 9/2016 | Sarukkai et al. |
| 10,217,352 B2 | 2/2019 | Arling |
| 10,553,106 B2 | 2/2020 | Jeon et al. |
| 2001/0043145 A1 | 11/2001 | Jacob, Jr. |
| 2003/0095211 A1 | 5/2003 | Nakajima |
| 2003/0103088 A1 | 6/2003 | Dresti et al. |
| 2003/0122698 A1 | 7/2003 | Horie et al. |
| 2003/0189509 A1 | 10/2003 | Hayes et al. |
| 2004/0070491 A1 | 4/2004 | Huang et al. |
| 2004/0143847 A1 | 7/2004 | Suzuki et al. |
| 2004/0203387 A1 | 10/2004 | Grannan |
| 2004/0266419 A1 | 12/2004 | Arling et al. |
| 2005/0094610 A1 | 5/2005 | de Clerq et al. |
| 2005/0096753 A1 | 5/2005 | Arling |
| 2005/0159823 A1* | 7/2005 | Hayes ................. H04L 12/2803 700/19 |
| 2005/0210498 A1 | 9/2005 | Scott, III et al. |
| 2006/0007015 A1 | 1/2006 | Krzyzanowski et al. |
| 2006/0025132 A1 | 2/2006 | Karaoguz et al. |
| 2006/0195553 A1 | 8/2006 | Nakamura |
| 2006/0200538 A1 | 9/2006 | Yuh et al. |
| 2006/0259784 A1 | 11/2006 | Niwamoto et al. |
| 2006/0263091 A1 | 11/2006 | Shimizu |
| 2007/0225828 A1 | 9/2007 | Huang et al. |
| 2008/0004954 A1 | 1/2008 | Horvitz |
| 2008/0005764 A1 | 1/2008 | Arling et al. |
| 2008/0044006 A1* | 2/2008 | Kitagawa ................ H04L 12/66 379/433.01 |
| 2008/0046919 A1 | 2/2008 | Carmi et al. |
| 2008/0098426 A1 | 4/2008 | Candelore |
| 2008/0134237 A1 | 6/2008 | Tu et al. |
| 2008/0195857 A1 | 8/2008 | Douillet |
| 2008/0221715 A1 | 9/2008 | Krzyzanowski et al. |
| 2008/0231762 A1 | 9/2008 | Hardacker et al. |
| 2008/0278567 A1 | 11/2008 | Nakajima |
| 2008/0319852 A1 | 12/2008 | Gardner et al. |
| 2008/0320531 A1 | 12/2008 | Kim et al. |
| 2009/0077492 A1 | 3/2009 | Ida |
| 2009/0092397 A1 | 4/2009 | Taguchi |
| 2009/0094645 A1 | 4/2009 | Ting |
| 2009/0113478 A1 | 4/2009 | Haughawout et al. |
| 2009/0121905 A1 | 5/2009 | Griffin, Jr. et al. |
| 2009/0157198 A1 | 6/2009 | Morikawa |
| 2009/0239587 A1* | 9/2009 | Negron ................. H04L 12/2836 455/566 |
| 2009/0254778 A1 | 10/2009 | Huang et al. |
| 2009/0289829 A1 | 11/2009 | Maier |
| 2009/0296731 A1 | 12/2009 | Lida et al. |
| 2009/0298535 A1 | 12/2009 | Klein et al. |
| 2009/0327910 A1 | 12/2009 | Black et al. |
| 2010/0013998 A1 | 1/2010 | Mortensen |
| 2010/0037264 A1 | 2/2010 | Hardacker et al. |
| 2010/0039282 A1 | 2/2010 | Hostage et al. |
| 2010/0043046 A1 | 2/2010 | Sen et al. |
| 2010/0079682 A1 | 4/2010 | Martch |
| 2010/0118193 A1 | 5/2010 | Boyden et al. |
| 2010/0121921 A1 | 5/2010 | Dunton |
| 2010/0149017 A1* | 6/2010 | Besshi ................... G08C 17/00 341/176 |
| 2010/0182236 A1 | 7/2010 | Pryor |
| 2010/0228611 A1 | 9/2010 | Shenfield |
| 2011/0018693 A1 | 1/2011 | Lim et al. |
| 2011/0067059 A1 | 3/2011 | Johnston et al. |
| 2011/0102230 A1 | 5/2011 | Vergis et al. |
| 2011/0122317 A1 | 5/2011 | Chen |
| 2011/0138327 A1 | 6/2011 | Scott et al. |
| 2011/0273625 A1* | 11/2011 | McMahon ......... H04N 21/2407 348/734 |
| 2011/0285818 A1 | 11/2011 | Park et al. |
| 2012/0025957 A1 | 2/2012 | Yang |
| 2012/0050310 A1 | 3/2012 | Patel et al. |
| 2012/0084662 A1 | 4/2012 | Navarro et al. |
| 2012/0086869 A1 | 4/2012 | Friedlander |
| 2012/0105721 A1 | 5/2012 | Huang et al. |
| 2012/0131245 A1 | 5/2012 | Wilcox |
| 2012/0133841 A1 | 5/2012 | Vanderhoff et al. |
| 2012/0144416 A1 | 6/2012 | Wetzer et al. |
| 2012/0249890 A1 | 10/2012 | Chardon et al. |
| 2012/0284758 A1 | 11/2012 | Adjesson |
| 2013/0069769 A1 | 3/2013 | Pennington et al. |
| 2013/0085851 A1 | 4/2013 | Pedro et al. |
| 2013/0276010 A1 | 10/2013 | Drayson |
| 2013/0304817 A1 | 11/2013 | Hu et al. |

(56) References Cited

U.S. PATENT DOCUMENTS

| | | | |
|---|---|---|---|
| 2014/0115631 | A1 | 4/2014 | Mak |
| 2014/0157305 | A1 | 6/2014 | Del Sordo et al. |
| 2014/0337879 | A1 | 11/2014 | Arling et al. |
| 2018/0357889 | A1 | 12/2018 | Arling et al. |
| 2019/0261043 | A1 | 8/2019 | Sato et al. |

FOREIGN PATENT DOCUMENTS

| | | | |
|---|---|---|---|
| DE | 19709800.2 A1 | 9/1998 | |
| EP | 0513443 A1 | 11/1992 | |
| EP | 2265003 A2 | 12/2010 | |
| GB | 2166328 A | 4/1986 | |
| JP | 05083765 | 4/1998 | |
| JP | 2010-034853 A | 2/2010 | |
| JP | 2013-085225 A | 5/2013 | |
| KR | 10-2011-0051788 | 5/2011 | |
| KR | 10-2013-0070764 | 6/2013 | |
| WO | 89/11137 A1 | 11/1989 | |
| WO | 00/13344 A1 | 3/2000 | |
| WO | 2007/105142 A1 | 9/2007 | |
| WO | 2011/145041 A1 | 11/2011 | |
| WO | 2014/189757 A1 | 11/2014 | |
| WO | 2016126609 A2 | 8/2016 | |

OTHER PUBLICATIONS

EPO, extended European search report issued on European patent application No. 21170794.8, dated Sep. 20, 2021, 7 pages.
KIPO, office action issued on Korean patent application No. 10-2017-7024670, dated May 24, 2022, 5 pages.
KIPO, English translation of office action issued on Korean patent application No. 10-2017-7024670, dated May 24, 2022, 6 pages.
KIPO, Notice of Final Rejection issued on Korean patent application No. 10-2016-7033626, dated Aug. 6, 2021, 4 pages.
KIPO, English translation of Notice of Final Rejection issued on Korean patent application No. 10-2016-7033626, dated Aug. 6, 2021, 5 pages.
Ingrid Wickelgren, Apr. 1997, IEEE Spectrum, vol. Apr. 1997, 7 pgs.
European Patent Office, Extended Search Report issued on EP patent application No. 12763258.6, dated Jul. 28, 2014, 8 pgs.
European Patent Office, Extended Search Report issued on EP patent application No. 11858754.2, dated Jan. 2, 2014, 7 pgs.
European Patent Office, Extended Search Report issued on EP patent application No. 11872554.8, dated Feb. 26, 2015, 5 pgs.
European Patent Office, Extended Search Report issued on EP patent application No. 11870232.3, dated Nov. 19, 2014, 7 pgs.
U.S.P.T.O., Final Office Action issued on U.S. Appl. No. 14/184,298, dated Jan. 15, 2015, 25 pgs.
U.S.P.T.O., Final Office Action issued on U.S. Appl. No. 14/184,325, dated Jan. 15, 2015, 19 pgs.
European Patent Office, extended search report issued on EP patent application No. 17192290.9, dated Dec. 22, 2017, 7 pgs.
U.S.P.T.O., Final Office Action issued on U.S. Appl. No. 14/282,785, dated Nov. 1, 2017, 18 pgs.
ANSI/CEA Standard, A DTV Profile for Uncompressed High Speed Digital Interfaces, Aug. 1, 2013, 186 pgs.
European Patent Offic, Extended Search Report issued on EP patent application No. 16747061.6, dated Oct. 16, 2017, 6 pgs.
The Int. Bureau of WIPO, Int. Preliminary Report on Patentability, Search Report and Written Opinion issued on PCT/US12/027841, 7 pgs.
European Patent Office, Extended Search Report issued on EP patent application No. 15796548.4, 7 pgs.
European Patent Office, Examination Report issued on EP patent application No. 11870232.3, 3 pgs.
Brazilian Patent Office, Office Action issued on Brazilian patent application No. BR112014006930.1, 2 pgs.
JPO, Office Action issued on JP patent application No. 2017-541066, 18 pgs.
U.S.P.T.O., Final Office Action issued in U.S. Appl. No. 14/282,785, dated Dec. 27, 2019, 10 pgs.
European Patent Office, Examination Report issued on EP patent application No. 16747061.6, 5 pgs.
Israeli Patent Office, Office Action issued on Israeli patent application No. 253817, 4 pgs.
Brazilian Patent Office, Office Action issued on Brazilian patent application No. BR1120140069301, 3 pgs.
CNIPA, Office Action issued on CN patent application No. 201680008875.3, 22 pgs.
JPO, Office Action issued on JP patent application No. 2017-541066, 15 pgs.
U.S.P.T.O., Non-Final Office Action issued on U.S. Appl. No. 14/282,785, dated Sep. 9, 2019, 9 pgs.
ISA/US, International Preliminary Report on Patentability issued on PCT application No. US2015/030258, dated Dec. 1, 2016, 7 pgs.
The Int. Bureau of WIPO, Int. Preliminary Report on Patentability issued on PCT application No. US16/15981, dated Aug. 8, 2017, 9 pgs.
The Int. Bureau of WIPO, Int. Preliminary Report on Patentability issued on PCT application No. US12/026503, dated Oct. 10, 2013, 9 pgs.
U.S.P.T.O., Office Action issued on U.S. Appl. No. 13/198,072, dated Jul. 22, 2013, 10 pgs.
U.S.P.T.O., Office Action issued on U.S. Appl. No. 14/245,195, dated Mar. 12, 2015, 16 pgs.
European Patent Office, Extended Search Report issued on EP patent application No. 12765455.6, dated Aug. 5, 2014, 9 pgs.
Indian Patent Office, office action issued on Indian patent application No. 201747027318, dated Apr. 12, 2021, 6 pages.
EPO, examination report issued on European patent application No. 21170794.8, dated Aug. 31, 2022, 3 pages.
United States Patent and Trademark Office, Non-Final Office Action issued in U.S. Appl. No. 17/733,254, dated Sep. 27, 2022, 10 pgs.

\* cited by examiner

SYSTEM AND METHOD FOR APPLIANCE CONTROL VIA A NETWORK

RELATED APPLICATION INFORMATION

This application claims the benefit of U.S. application Ser. No. 16/596,549, filed on Oct. 8, 2019, which application claims the benefit of U.S. application Ser. No. 16/106,831, filed on Aug. 21, 2018, which application claims the benefit of U.S. application Ser. No. 14/736,909, filed on Jun. 11, 2015, which application claims the benefit of f U.S. application Ser. No. 13/328,416, filed on Dec. 16, 2011, which application claims the benefit of U.S. patent application Ser. No. 13/071,661, filed Mar. 25, 2011.

The disclosures within these applications are incorporated herein by reference in their entirety.

BACKGROUND

Controlling devices, for example remote controls, for use in issuing commands to entertainment and other appliances, and the features and functionality provided by such controlling devices are well known in the art and have become ubiquitous in the home. Wireless network technologies such as WiFi, Bluetooth, etc., are increasing deployed in homes in support of personal communication, productivity, and entertainment devices such as tablet computers, smart phones, portable email devices, e-books, hand-held games and/or game controllers, portable media players, etc. (all referred to hereafter as "smart devices").

SUMMARY

This invention relates generally to controlling devices such as remote controls, and more specifically to controlling devices which incorporate wireless networking capability. In an exemplary embodiment, a controlling device may be provisioned with a wireless network interface such as a WiFi transceiver and associated programming in addition to conventional IR and/or RF transmitters and/or transceivers for issuing appliance commands. This wireless network interface may be used to receive and relay appliance command requests from other devices present on the network, for example smart phones, tablet or desktop computers, or if enabled, even distant devices via a wide area network such as the Internet. Further, in some embodiments the controlling device, for example a universal remote control, may utilize such a wireless networking capability to communicate with local appliances or Internet based services to facilitate setup and configuration of the controlling device, for appliance identification purposes, etc.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
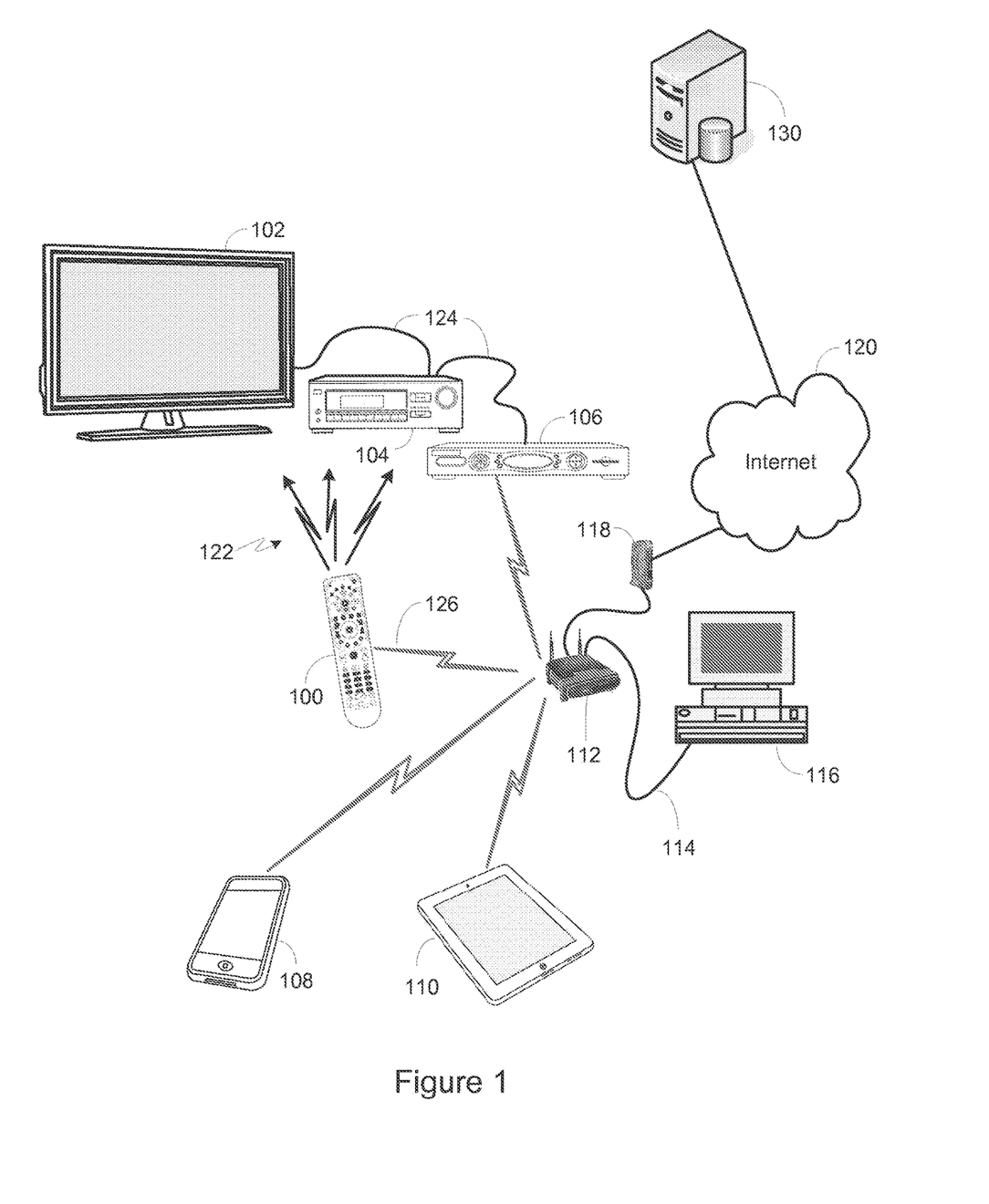
FIG. 1 illustrates an exemplary system in which a controlling device constructed in accordance with the instant invention may be utilized.

With reference to FIG. 1, there is illustrated an exemplary system in which a controlling device 100 is configured to control various controllable appliances, such as a television 102, an AV receiver 104 and a set top box ("STB") 106. As is known in the art, the controlling device 100 may be capable of transmitting commands to the appliances, using any convenient IR, RF, Point-to-Point, or networked protocol 122, to cause the appliances to perform operational functions. While illustrated in the context of a television 102, AV receiver 104, and STB 106, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. Controlling device 100 may be further adapted to support a wireless communication interface 126 to a local network, for example a home WiFi network enabled by a router and wireless access point 112. Exemplary other devices with wireless access to the network may include a smart phone 108, a tablet computer 110, and STB 106. Router 112 may also offer wired access 114 to the local network, for example supporting a desktop computer 116. Access to a wide area network 120 such as the Internet may be available through router 112 and network gateway device 118 such as a cable modem, DSL service, etc. In some embodiments, certain appliances may be digitally interconnected, for example via HDMI interface cables 124. It will be appreciated that although the illustrative WiFi network of FIG. 1 is depicted as operating in the so-called "WiFi infrastructure mode", i.e., with all devices communicating through a common central switching means (e.g., router 112), in many applications certain WiFi-enabled devices may also be adapted to communicate directly with one another on a point-to-point basis using the so-called "WiFi direct" or "ad hoc networking" mode of operation. Accordingly, in the further illustrations that follow WiFi links between devices may be depicted for simplicity in the form of direct paths with the understanding that any available WiFi operational mode may be used without limitation, as appropriate for a particular embodiment.

Figure 2:
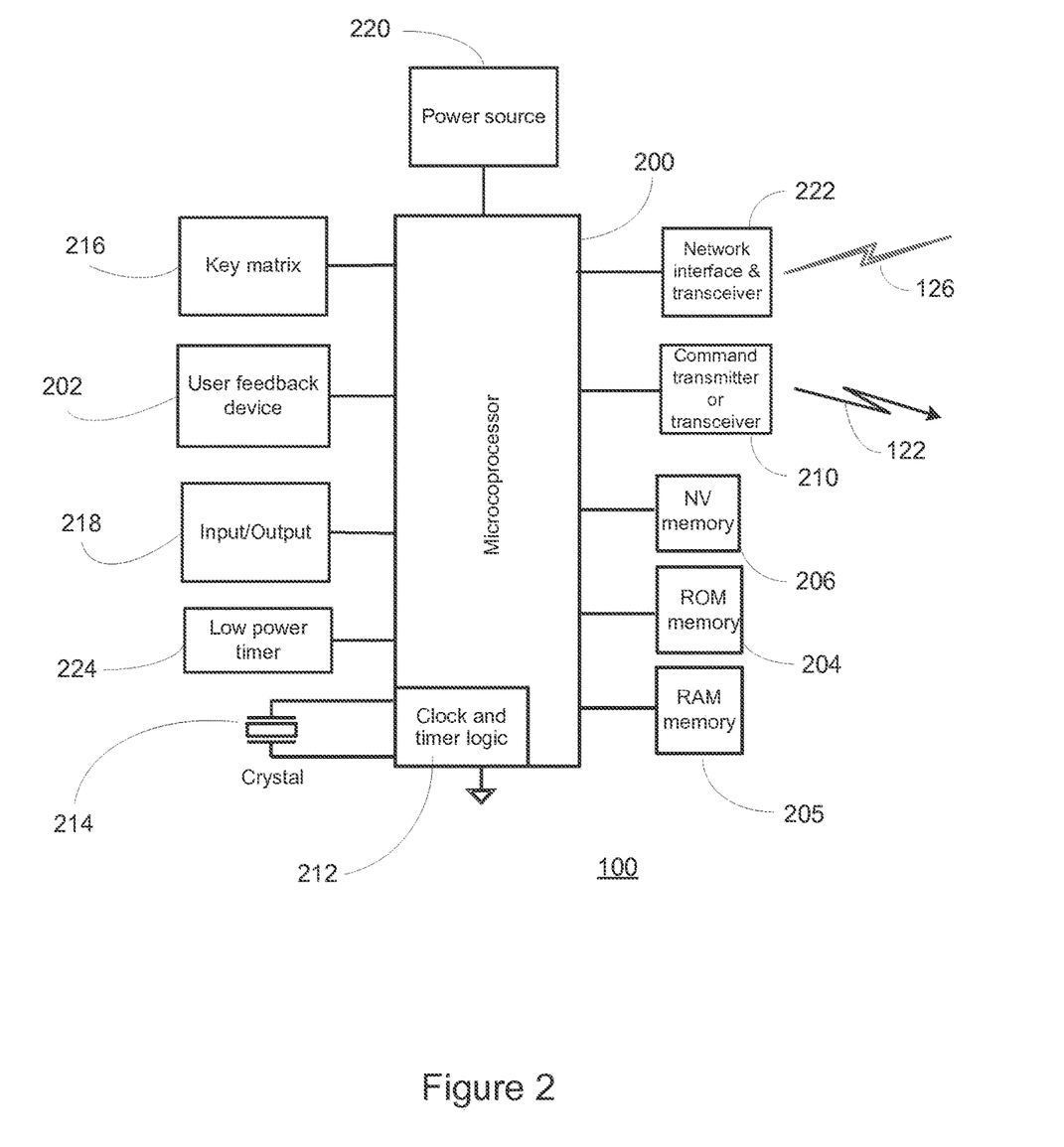
FIG. 2 illustrates in block diagram form components of the exemplary controlling device of FIG. 1.

With reference to FIG. 2, for use in commanding the functional operations of one or more appliances, the controlling device 100 may include, as needed for a particular application, a processor 200 coupled to a ROM memory 204, a non-volatile read/write memory 206, a RAM memory 205, a key matrix 216 (e.g., hard keys, soft keys such as a touch sensitive surface overlaid on a liquid crystal (LCD), and/or an electroluminescent (EL) display), transmission circuit(s) and/or transceiver circuit(s) 210 (e.g., IR and/or RF) for use in issuing commands to controlled appliances, a means 202 to provide feedback to the user (e.g., one or more LEDs, illuminable keys, display, speaker, and/or the like), an input/output port 218 such as a serial interface, USB port, modem, etc., a power source 220 such as a battery, and clock and timer logic 212 with associated crystal or resonator 214, a local network interface and transceiver 222 such as for example an IEEE 802.11 "WiFi" interface, and in certain embodiments a low power timing device 224 which may be incorporated into processor 200, for example in the form of a nanopower ring oscillator as may be found in the MAXQ610 microprocessor available from Maxim Integrated Products Inc., may form part of local network interface 222, or may comprise a separate component.

As will be understood by those skilled in the art, some or all of the memories 204, 205, 206 may include executable instructions (collectively, the controlling device program memory) that are intended to be executed by the processor 200 to control the operation of the controlling device 100, as well as data which serves to define the necessary control protocols and command values for use in transmitting command signals to controllable appliances (collectively, the command data). In this manner, the processor 200 may be programmed to control the various electronic components within the controlling device 100, e.g., to monitor the key matrix 216 and/or network interface 222, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 206 are non-volatile or battery-backed such that data is not required to be reloaded after battery changes. In addition, the non-transitory memories 204, 205 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, receipt of a network transmission, etc. In response to an event, appropriate instructions within the program memory (hereafter the "controlling device operating program") may be executed. For example, when a command function key is actuated on the controlling device 100, the controlling device 100 may retrieve from the command data stored in memory 204, 205, 206 a command value and control protocol corresponding to the actuated function key and, where necessary, current device mode and transmit that command to an intended target appliance, e.g., STB 106, in a format recognizable by that appliance to thereby control one or more functional operations of that appliance. It will be appreciated that the controlling device operating program can be used not only to cause the transmission of commands and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092. Additionally, in the instant invention the controlling device operating program of exemplary controlling device 100 may be operative to send and receive messages via local network transceiver 222 as will be disclosed in greater detail hereafter. In certain embodiments the controlling device operating program may utilize low power timer 224 to periodically wake processor 200 from a quiescent state in order to monitor transceiver 222 for incoming messages, for battery conservation purposes as are known in the art.

In some embodiments, controlling device 100 may be of the universal type, that is provisioned with a library comprising a multiplicity of command codes and protocols, i.e., command data, suitable for controlling various appliances. In such cases, for selecting sets of command data to be associated with the specific appliances to be controlled (hereafter referred to as a setup procedure), data may be entered into the controlling device 100 that serves to identify each intended target appliance by its make, and/or model, and/or type. Such data allows the controlling device 100 to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice as is well known in the art, such data used to identify an appropriate command data set may take the form of a numeric setup code entered via activation of those keys that are also used to cause the transmission of commands to an appliance (obtained, for example, from a printed list of manufacturer names and/or models with corresponding code numbers, from a support Web site, etc.). Alternative setup procedures known or proposed in the art include scanning bar codes, sequentially transmitting a predetermined command in different formats until a target appliance response is detected, user interaction with a Web site culminating in downloading of command data and/or setup codes to the controlling device, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938, all of like assignee and incorporated herein by reference in their entirety.

Figure 3:
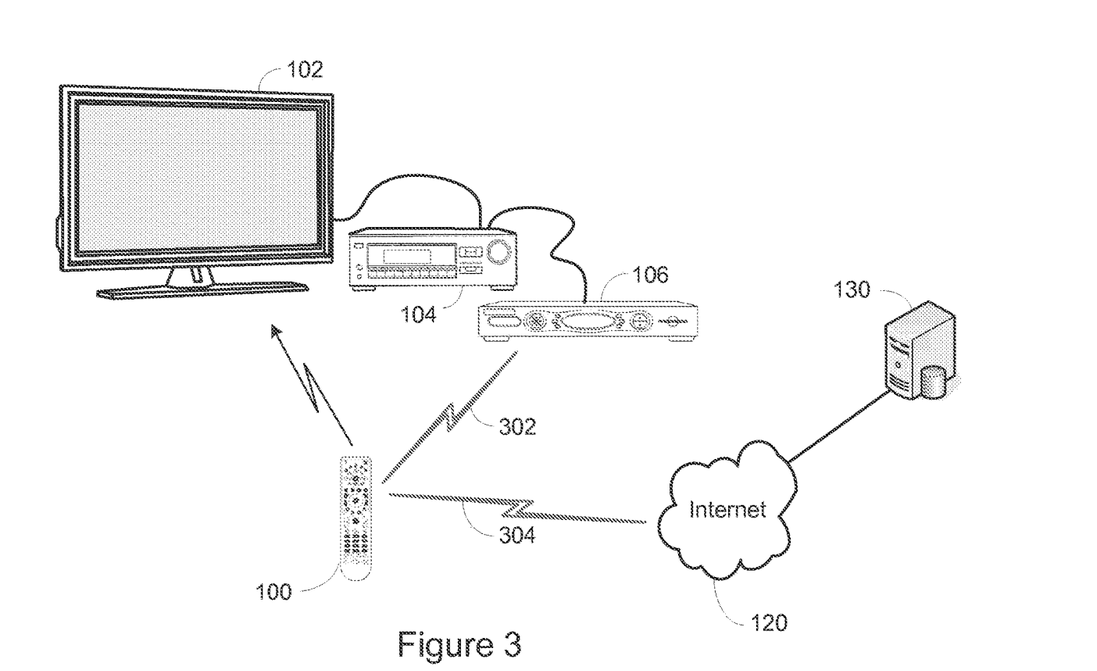
FIGS. 3 and 4 further illustrate systems in which an exemplary controlling device constructed in accordance with the invention may be utilized.

In yet further alternative setup procedures, in certain embodiments a controlling device with WiFi or other local network connectivity may utilize this connectivity to facilitate the identification of intended target appliances and their associated command data sets. As illustrated in FIG. 3, exemplary controlling device 100 may communicate directly 302 with an appliance, for example STB 106, in order to execute an interactive setup procedure as described in U.S. Pat. No. 7,969,514, or to download appliance identification data stored in the memory of appliance 106 or derived from other appliances which share an HDMI interconnection 124 such as TV 102 or AV receiver 104, for example as described in co-pending U.S. patent application Ser. No. 12/716,365, entitled "Digital Interconnect of Entertainment Equipment in the Home," Ser. No. 13/240,604 entitled "System and Method for Configuring Controlling Device Functionality," Ser. No. 13/198,072 entitled "System and Method for Configuring the Remote Control Functionality of a Portable Device," all of common ownership and all incorporated herein by reference in their entirety, or in the before mentioned Ser. No. 12/148,444 entitled "Using HDMI-CEC to Identify a Codeset." Once the desired appliance has been identified, an appropriate command data set may be selected from a library of command data sets preloaded in the memory of controlling device 100; or may be downloaded into controlling device 100 from a library of command data sets stored on a local appliance, for example STB 106, or on a network accessible server 130. In the event the command data set library is located on a Web server 130, the requisite data set may be provisioned to a WiFi enabled controlling device 100 either by direct interaction 304 with the Internet 120, or via an intermediate appliance such as STB 106, as appropriate for a particular embodiment.

Figure 4:
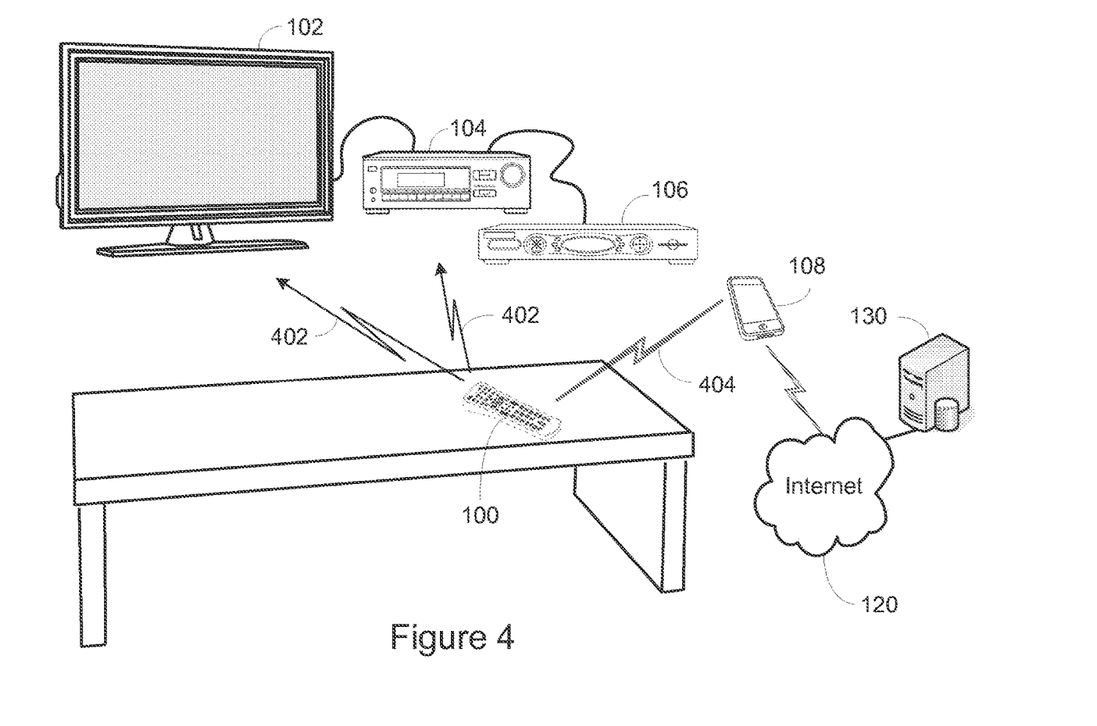

With reference to FIG. 4, once so configured an exemplary controlling device 100, in addition to its conventional functionality, may be adapted to make itself available as a bridge or relay device to issue appliance commands 402 in response to requests 404 received via a wireless local network from, for example, a remote control app resident in a smart device 108, as will now be described in further detail.

Figure 5:
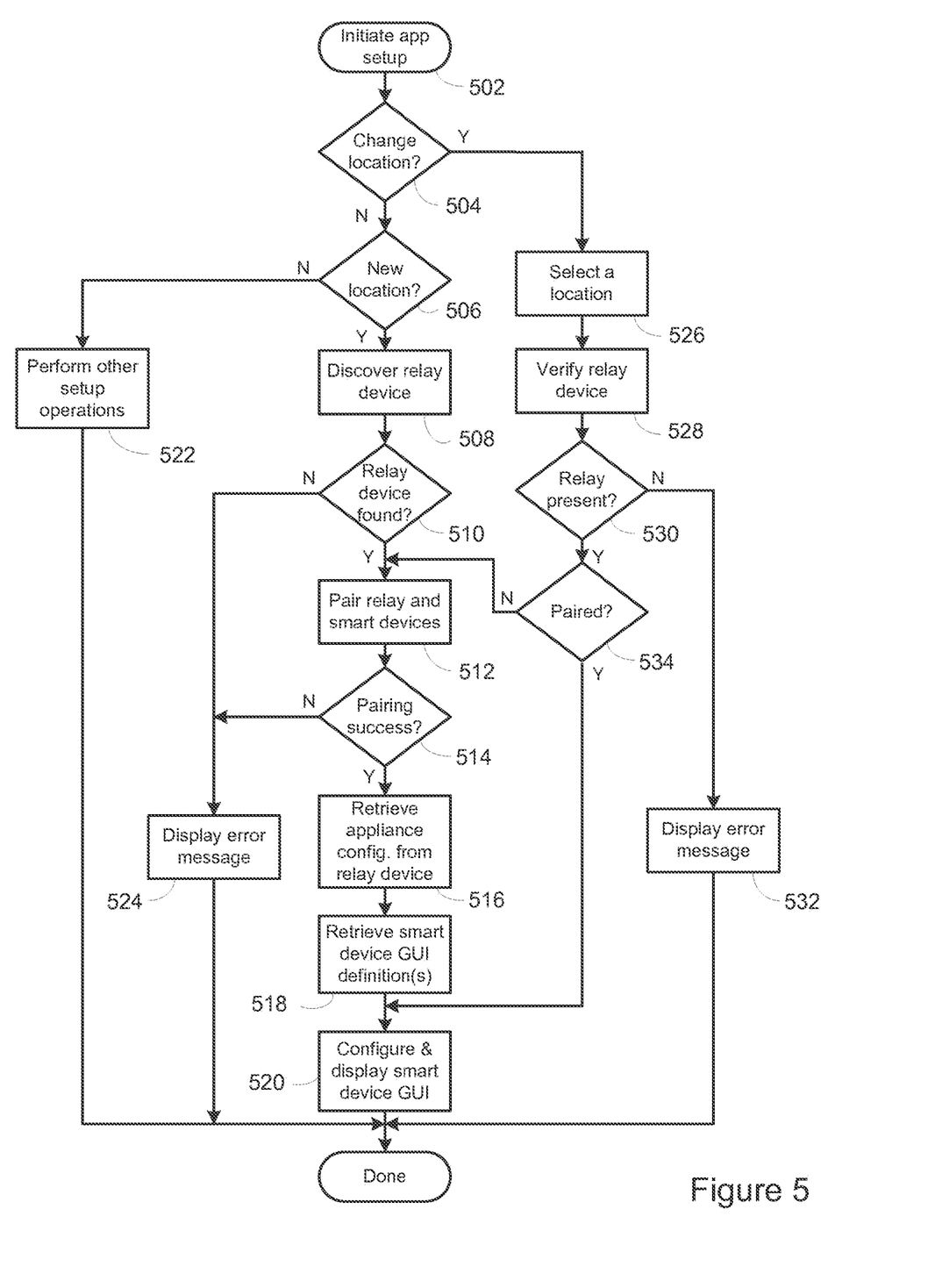
FIG. 5 illustrates an exemplary operational flow as may be implemented in configuring a smart device to utilize features of the controlling device of FIGS. 1 and 4.

Turning now to the flowchart of FIG. 5, after installation on a smart device such as 108 of FIG. 4 a remote control app may be placed into a setup mode at step 502. The setup mode may be initiated for example by user activation of a "setup" icon, automatically upon initial installation, etc., as appropriate. Once in the setup mode, at steps 504 and 506 the remote control app may determine, via additional user input for example, whether the setup mode was invoked to configure a new location or to select an existing location. By way of explanation, in some embodiments a remote control app may be capable of supporting multiple appliance configurations and multiple associated network-enabled controlling devices, corresponding for example to living room/bedroom locations, town home/vacation home locations, etc. As will be appreciated step 504 may be omitted, for example if no location is currently configured or in those embodiments in which only a single location configuration is supported, etc. If neither of these operations is indicated, at step 522 other setup operations appropriate to a particular app may be performed, for example and without limitation programming of activity macros (to the extent these are not already available through controlling device 100), entry of favorite channel information, setting of parental controls, etc.

If it is determined at step 506 that a new location is to be configured, at step 508 the app resident in smart device 108 may initiate discovery of other devices present on the local wireless network, and in particular devices which identify themselves as compatible command relay platforms. If no such devices are found an appropriate error report is communicated to the user at step 524, whereupon the app may exit setup mode. If, however, compatible command relay device(s) are found, at step 512 the app and a relay device may be paired, i.e., numeric or alphanumeric codes, key values, hardware addresses, serial numbers, etc. may be exchanged between the app and the relay device (sometimes requiring user interaction such as entering a numeric value presented on a display, printed on a label, etc.) in order that they may uniquely recognize transmissions from one another in the future. In the event more than one compatible relay device was located at step 508, step 512 may also include soliciting input from a user to select a particular command relay device. This pairing step may also comprise user provision of a location name or other identifier by which this particular command relay device and its associated appliances may be identified in the future. In suitably equipped smart devices this step may also include the association of GPS coordinates with the stored configuration. If it is determined at step 514 that pairing could not be successfully completed, an error message is displayed as before and the app exits setup mode.

Once paired, at step 516 the smart device app may use the now-established communication path to request appliance configuration information from controlling device 100. Such information may comprise, for example one or more of the number and types of appliances currently configured in controlling device 100; the identities of the command code data sets currently in use by controlling device 100 for issuing commands to target appliances; the configured appliance identification data such as brand or model numbers, etc. Such information may be used by the smart device app at step 518 to retrieve information for use in configuring GUI pages, for example listings of supported commands, display icons, etc., which may be downloaded from a Web server 130. In an alternate embodiment, information regarding which specific command functions are supported by each of the appliances may be provided directly by controlling device 100 in place of, or in addition to, the Web downloaded data. In a yet further alternate embodiment, an identity associated with the controlling device 100 itself may be utilized either in place of or in conjunction with the previously described methods. For example, in cases where controlling device 100 was provided as original equipment together with a target appliance, e.g. AV receiver 104, a MAC address, serial number, or other identifying data procured from controlling device 100 may be referred to a web service 130 whereat a database cross-referencing controlling device MAC addresses, serial numbers, etc., to the specific appliances with which they were shipped may be utilized to exactly identify a target appliance, e.g. AV receiver 104, and its corresponding features and command code set. At step 520 this information may then be used to configure the smart device app GUI to match the appliances to be controlled, for example by removal of unsupported functions or addition of supported functions in touch screen display pages, incorporation of appliance or brand specific icons or logos, etc. As will be appreciated, in certain small footprint embodiments of a remote control app, such GUI customization may be forgone in favor of a standardized default GUI which may present only frequently used command functions which are common to a majority of appliance brands and models. Once any such GUI customization is concluded, setup is complete and the app may exit the setup mode or conduct any further location dependent configuration steps, for example communicating with controlling device 100 or STB 106 to download favorite channel settings applicable to the current location.

Returning to step 504, if it is determined that the setup mode was initiated in order to change the currently assigned location, at step 526 the user may be requested to select a location to be configured, for example from a displayed list of location identities previously supplied by the user(s) at step(s) 512. Alternatively, in suitably equipped smart devices the current GPS coordinates may be compared to those previously associated with the presently selected location and location reconfiguration automatically trigged if these coordinates differ by a significant amount, e.g., by more than a room size for room locations or by a house/yard size for house locations. Regardless, at step 530 it is then determined if the relay device associated with that location is in fact present in the current environment, i.e., is discoverable. If not, at step 532 an appropriate error message is displayed and the app exits setup mode. If the relay device is confirmed as present, at step 534 it may next be determined if the command relay device remains paired. By way of explanation, in some embodiments a controlling device which is also operable as a command relay device may be adapted to cancel or void its pairing information if the controlled appliances are reconfigured, for example an appliance is deleted or replaced, a new appliance is added, etc. In such cases, step 534 may cause the smart device app to continue at step 516, thereby reconfiguring the app to conform to the new appliance configuration. If however no changes have been made and the relay device remains paired, then processing may continue at step 520 which may configure the app GUI to match the selected location.

Figure 6:
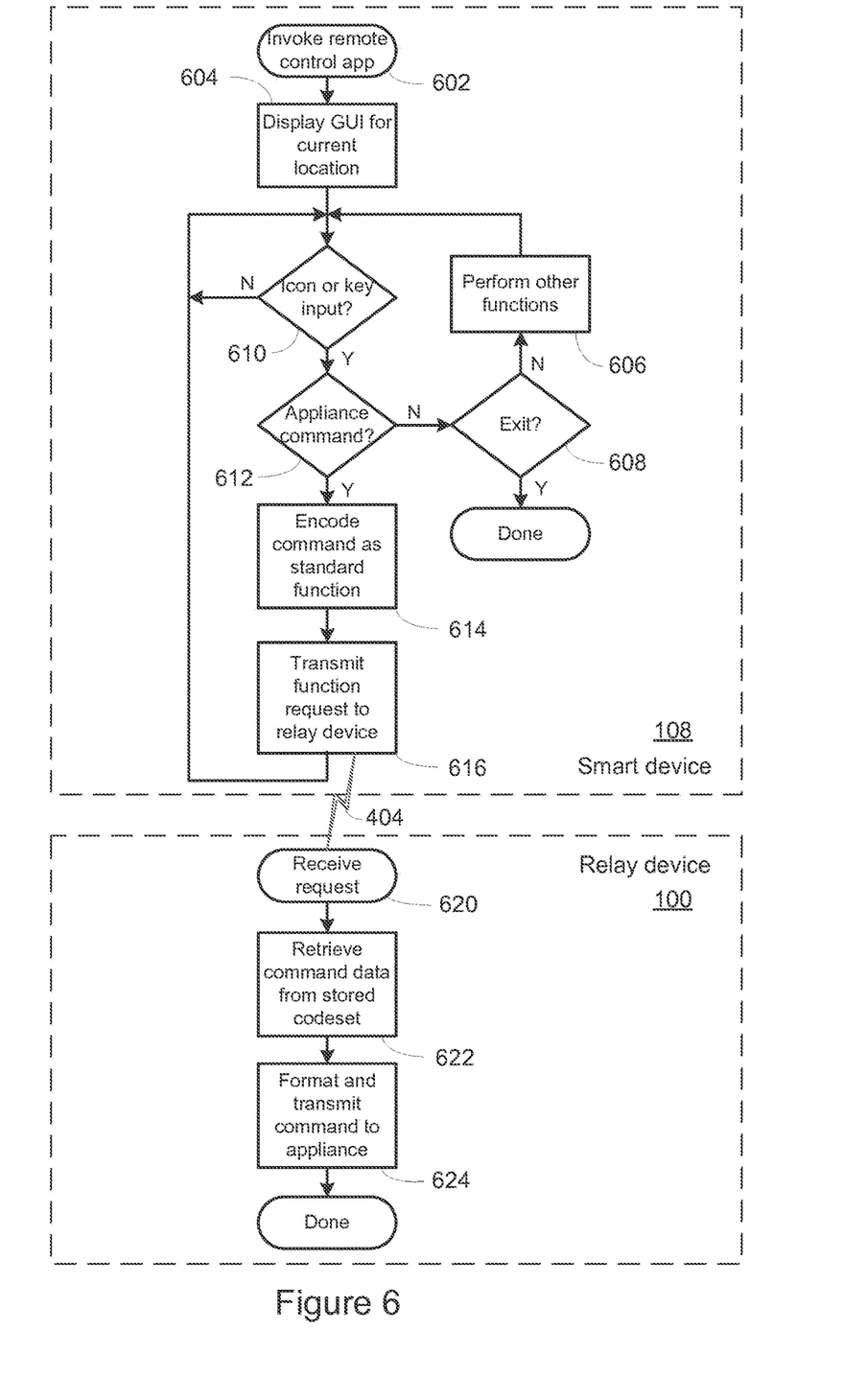
FIG. 6 illustrates an exemplary operational flow as may be implemented to cause a user-requested appliance command to be issued in accordance with this invention.

Once configured, an exemplary smart device remote control app may be operative to cause appliance commands to be issued as will now be described in conjunction with FIG. 6. When invoked at step 602, the smart device remote control app may load and present a GUI at step 604, e.g., display a set of icons representing touch-activated command functions comprising one or more pages, which GUI may have been configured and associated with the current location of the smart device as described previously. At step 610 the exemplary smart device remote control app may then await user input such as actuation of a touch icon, a hard key, a gesture or motion, etc. Upon receipt of user input, at step 612 it may then be determined if the input comprises an appliance command request. If not, at steps 606 and 608 other input functions may be processed, for example app termination and exit, display of additional pages of command icons, etc.

If it is determined that the received input comprises a request for an appliance command, at step 614 the requested function is encoded using a standardized set of generic function indicators and appliance type indicators which are compatible with the controlling device operating program of an associated relay device, e.g., controlling device 100 of the instant example. In this regard, any convenient set of standard function and appliance type indicators which is supported by both requesting and receiving devices may be utilized as appropriate for a particular embodiment. For reference and without limitation, examples of such sets of standardized indicators may be found in U.S. patent application Ser. No. 11/088,694 or 12/716,365, both of common ownership and incorporated herein by reference in their entirety. Thereafter at step 616 a request comprising the standard function indicator information may be communicated via the local network to relay device 100.

Upon receipt of such a request at step 620, at step 622 the controlling device operating program of a command relay device such as the exemplary controlling device 100 may retrieve from codeset data stored in memory 204, 205, 206 the command value and control protocol information which corresponds to the requested appliance and function. Thereafter at step 624 this retrieved information may be employed to transmit a command signal which will cause the designated appliance to perform the desired operation.

While various concepts have been described in detail, it will be appreciated by those skilled in the art that various modifications and alternatives to those concepts could be developed in light of the overall teachings of the disclosure. For example, while presented above in the form of an illustrative embodiment in which a WiFi enabled controlling device interacts with an app resident in a smart device, it will be appreciated that the methods described herein may be utilized in conjunction with any suitable local network technology, e.g., Bluetooth, Zigbee, Zwave, etc., and may serve to provide appliance control functionality to apps and/or other software programming resident in many different types of devices, e.g. smart devices, PCs, game consoles, home automation systems, etc., local or remote.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer-readable media having instructions stored thereon wherein the instructions, when executed by a first device, cause the first device to perform steps comprising:
    in response to being paired with a second device, providing to the second device a user interface configuration data, the user interface configuration data being used by the second device to configure the second device with a user interface appropriate for a target device, the user interface appropriate for the target device having a user interface element which, when activated, will cause an appliance indicator data and a function indicator data, which are different than the user interface configuration data, to be sent from the second device to the first device;
    in response to subsequently receiving from the second device the appliance indicator data and the function indicator data, using the appliance indicator data and the function indicate data to select from a codeset data stored in a memory of the first device a command value and a control protocol information and using the selected command value and the selected control protocol information to generate a command signal for intended receipt by the target device target appliance.

2. The non-transitory, computer-readable media as recited in claim 1, wherein the user interface configuration data comprises a device identity data retrieved directly from the target device.

3. The non-transitory, computer-readable media as recited in claim 2, wherein the instructions, when executed by the first device, cause the first device to execute a discovery process to retrieve the device identity data from the target device.

4. The non-transitory, computer-readable media as recited in claim 3, wherein the instructions, when executed by the first device, cause the first device to use the device identity data to identify the codeset data.

5. The non-transitory, computer-readable media as recited in claim 1, wherein the user interface configuration data comprises data that identifies the codeset data.

6. The non-transitory, computer-readable media as recited in claim 1, wherein the user interface configuration data comprises a data indicative of a unique identifier provided to the first device.

7. The non-transitory, computer-readable media as recited in claim 6, wherein the unique identifier provided to the first device comprises a MAC address provided to the first device.

8. The non-transitory, computer-readable media as recited in claim 1, wherein the instructions, when executed by the first device, cause the first device to cancel its pairing with the second device in response to the first device no longer being paired with the target device.

9. The non-transitory, computer-readable media as recited in claim 1, wherein the instructions, when executed by the first device, cause the first device to cancel its pairing with the second device in response to the target device being replaced by a new target device.

10. The non-transitory, computer-readable media as recited in claim 1, wherein the first device is communicatively coupled to the target device via use of a wireless connection.

11. The non-transitory, computer-readable media as recited in claim 1, wherein the first device is paired with the second device after a successful exchange of key values with the second device.

12. The non-transitory, computer-readable media as recited in claim 1, wherein the first device is paired with the second device after a successful exchange of device serial numbers.

13. The non-transitory, computer-readable media as recited in claim 1, wherein the first device is paired with the second device after a successful exchange of device hardware addresses.

14. The non-transitory, computer-readable media as recited in claim 1, wherein the first device is paired with the second device after a successful exchange of device alphanumeric codes.

15. The non-transitory, computer-readable media as recited in claim 1, wherein the pairing operation further comprises a provision of a location name to the pairing.

* * * * *